United States Patent
Kim et al.

(10) Patent No.: US 8,509,308 B2
(45) Date of Patent: Aug. 13, 2013

(54) WAVELET TRANSFORM APPARATUS AND METHOD, SCALABLE VIDEO CODING APPARATUS AND METHOD EMPLOYING THE SAME, AND SCALABLE VIDEO DECODING APPARATUS AND METHOD THEREOF

(75) Inventors: Joo-Hee Kim, Seongnam-si (KR); Hye-Yun Kim, Yongin-si (KR); Doo-Hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1389 days.

(21) Appl. No.: 11/662,016

(22) PCT Filed: Sep. 16, 2005

(86) PCT No.: PCT/KR2005/003104
§ 371 (c)(1),
(2), (4) Date: Jul. 5, 2007

(87) PCT Pub. No.: WO2006/031093
PCT Pub. Date: Mar. 23, 2006

(65) Prior Publication Data
US 2007/0253487 A1 Nov. 1, 2007

Related U.S. Application Data

(60) Provisional application No. 60/610,189, filed on Sep. 16, 2004, provisional application No. 60/617,675, filed on Oct. 13, 2004.

(51) Int. Cl.
*H04N 7/12* (2006.01)
(52) U.S. Cl.
USPC ........... 375/240.19; 375/240.11; 375/240.12; 375/240.16; 348/699; 382/232; 382/238; 382/247

(58) Field of Classification Search
USPC ............. 375/240.16, 240.19, 19, 240.11–12; 348/699; 382/232, 238, 247
See application file for complete search history.

(56) References Cited

U.S. PATENT DOCUMENTS 5,737,023 A 4/1998 Linzer .......................... 348/416
7,627,037 B2 * 12/2009 Li et al. ..................... 375/240.19

(Continued)

FOREIGN PATENT DOCUMENTS

| EP | 1601204 A1 | 11/2005 |
|---|---|---|
| KR | 10-2005-0074151 | 7/2005 |
| WO | WO 03/094526 | 11/2003 |

OTHER PUBLICATIONS

Barbell-Lifting Based 3-D Wavelet Coding Scheme Ruiqin Xiong; Jizheng Xu; Feng Wu; Shipeng Li. Circuits and Systems for Video Technology, IEEE Transactions on (1051-8215) 2007. vol. 17,Iss. 9;p. 1256-1269;Source: IEEE Electronic Library Online.*

(Continued)

*Primary Examiner* — Taghi Arani
*Assistant Examiner* — Angela Holmes
(74) *Attorney, Agent, or Firm* — Staas & Halsey LLP

(57) ABSTRACT

Provided are a lift-based wavelet transform apparatus and method, a scalable video coding apparatus and method using the same, and a scalable video decoding apparatus and method. The lifting-based wavelet transform apparatus includes: a prediction unit which performs bi-directional motion compensation on odd-indexed frames based on even-indexed frames and generates high-frequency frames using differential frames from which most of energy is removed; an update determination unit which, in the even-indexed frame, determines whether to update each target block at which a reference block indicated by a motion vector is placed; and an update unit which updates a target block of the even-indexed frame which is determined to be updated by adding the differential frame to each target sub-block included in the target block and generates low-frequency frames.

24 Claims, 15 Drawing Sheets

(56) References Cited

U.S. PATENT DOCUMENTS

| | | | |
|---|---|---|---|
| 2003/0202599 A1* | 10/2003 | Turaga et al. | 375/240.19 |
| 2005/0047509 A1* | 3/2005 | Lee et al. | 375/240.19 |
| 2005/0185795 A1 | 8/2005 | Song et al. | 380/218 |
| 2006/0039472 A1* | 2/2006 | Barbarien et al. | 375/240.16 |

OTHER PUBLICATIONS

Motion-compensated wavelet transform coding for color video compression Zhang, Y.-Q.; Zafar, S. Circuits and Systems for Video Technology, IEEE Transactions on (1051-8215) 1992. vol. 2,Iss.3;p. 285-296;Source: IEEE Electronic Library Online.*

Generalized rate-distortion optimization for motion-compensated video coders Yan Yang; Hemami, S.S. Circuits and Systems for Video Technology, IEEE Transactions on (1051-8215) 2000. vol. 10,Iss. 6;p. 942-955;Source: IEEE Electronic Library Online.*

International Search Report in corresponding PCT App. No. PCT/KR2005/003104.

Written Opinion of the International Searching Authority in corresponding PCT App. No. PCT/KR2005/003104.

Korean Office Action issued Nov. 7, 2006 in corresponding Korean Patent Application No. 10-2005-0087018.

Baud, G. et al., *Responses of CE1e: Adaptive update step in MCTF*, ISO/IEC JTC 1/SC 29/WG 11, MPEG 2004/M10987, Jul. 2004.

Ji, X. et al., Responses of CE1d: Base-Layer, ISO/IEC JTC 1/SC 29/WG 11, MPEG 2004/M11127, Jul. 2004.

Schwarz, H. et al., *Scalable Extension of H.264/AVC*, ISO/IEC JTC1/SC29/WG11, MPEG 2004/M10569/S03, Mar. 2004.

Li Song et al., "Coding of Moving Pictures and Audio", ISO/IEC JTC1/SC 29/WG 11, MPEG 2004/M11129, Jul. 2004, pp. 1-8.

* cited by examiner

FIG. 7A (2, 0)

| 0 | 0 | 0 | 0 |
|---|---|---|---|
| a | b | c | d |
| e | f | g | h |
| i | j | k | l |

FIG. 7B (2, 1)

| a | b | c | d |
|---|---|---|---|
| e | f | g | h |
| i | j | k | l |
| m | n | o | p |

_US 8,509,308 B2_

WAVELET TRANSFORM APPARATUS AND METHOD, SCALABLE VIDEO CODING APPARATUS AND METHOD EMPLOYING THE SAME, AND SCALABLE VIDEO DECODING APPARATUS AND METHOD THEREOF

TECHNICAL FIELD

The present invention relates to a scalable video coding apparatus and method, and more particularly, to a lifting-based wavelet transform apparatus and method, a scalable video coding apparatus and method employing the lifting-based wavelet transform apparatus and method, and a scalable video decoding apparatus and method thereof.

BACKGROUND ART

Motion compensated temporal filtering (MCTF), which is a technology for reducing temporal redundancy using a wavelet transform, is commonly addressed in a number is of documents suggested in scalable video coding in part 13 of MPEG-21. Conventional wavelet transforms have mostly been used to decompose high-frequency components and low-frequency components in vertical and horizontal directions in a spatial domain.

However, in MCTF, a video sequence is decomposed in a temporal domain through motion estimation. Recently, MCTF has improved due to bi-directional motion estimation and video decomposition using multiple reference videos.

To decompose a video sequence into high-frequency frames and low-frequency frames more efficiently, a lifting-based wavelet transform may be used in MCTF. The lifting-based wavelet transform includes a prediction step and an update step. In a lifting framework using a 5/3 bi-orthogonal filter, in the prediction step, bi-directional motion compensation is performed on odd-indexed frames based on even-indexed frames. Then, high-frequency frames are generated using differential frames from which as much energy as possible is removed. In the update step, each of the differential frames is added to the even-indexed frames. Thus, the even-indexed frames are updated, and low-frequency frames are generated.

When $s_k(X)$ is a video signal having a spatial coordinate of $X=(x,y)^T$ and a temp oral coordinate of k, motion-compensated lifting steps may be defined as $$h_k[X]=f_{2k+1}[X]-P(f_{2k+1}[X])$$

$$l_k[X]=f_{2k}[X]+U(f_{2k}[X])>>1, \quad (1)$$

where $h_k[X]$ and $l_k[X]$ denote a high-frequency frame and a low-frequency frame, respectively.

When the 5/3 bi-orthogonal filter is used, a predictive operator P and an update operator U in Equation 1 may be defined as $$P(f_{2k+1}[X])=w_0 f_{2k}[X+m_{P0}]+w_1 f_{2k+2}[X+m_{P1}]$$

$$U(f_{2k}[X])=w_0 h_{k-1}[X+m_{U0}]w_1 h_k[X+m_{U1}], \quad (2)$$

where $m_{PX}$ denotes a predictive motion vector for a list X (here, X has a value of 0 or 1, wherein 0 indicates a previous reference frame and 1 indicates a next reference frame) and $m_{UX}$ denotes an update motion vector for the list X. In addition, $w_o$ and $w_1$ are weights used in bi-directional motion estimation/compensation.

In such a lift-based wavelet transform, noise and aliasing caused by low-pass-filtering an input frame sequence along motion trajectories, can be reduced in regions where a motion vector was accurately estimated, during the update step. However, in regions where a motion vector was not accurately estimated, a low-pass-filtered frame may have serious visual artifacts such as ghosting. In other words, a reconstructed video sequence formed of selected low-pass-filtered frames, i.e., low-frequency frames, at a reduced temporal resolution, i.e., a low frame rate has video quality deteriorated due to visual artifacts. To reduce visual artifacts, various adaptive update schemes that introduce a weight function in the update step have been proposed, including 'Response of ce le: Adaptive Update Step in MCTF" by G. Baud, J. Reichel, F. Ziliani, and D. Santa Cruz (ISO/IEC JTC1/SC29/WG11MPEG M10987, Redmond, July 2004) and "Response of ce le in SVC: Content-Adaptive Update Based on Human Vision System" by L. Song, J. Xu, H. Xiong, and F. Wu (ISO/IEC JTC1/SC29/WG11MPEG M11127, Redmond, July 2004).

BRIEF DESCRIPTION OF THE DRAWINGS

FIGS. 7A and 7B respectively illustrate examples of allocating "zero" to unconnected pixels in 4×4 target sub-blocks according to an embodiment of the present invention;

DETAILED DESCRIPTION OF THE INVENTION

Technical Goal of the Invention

Figure 1:
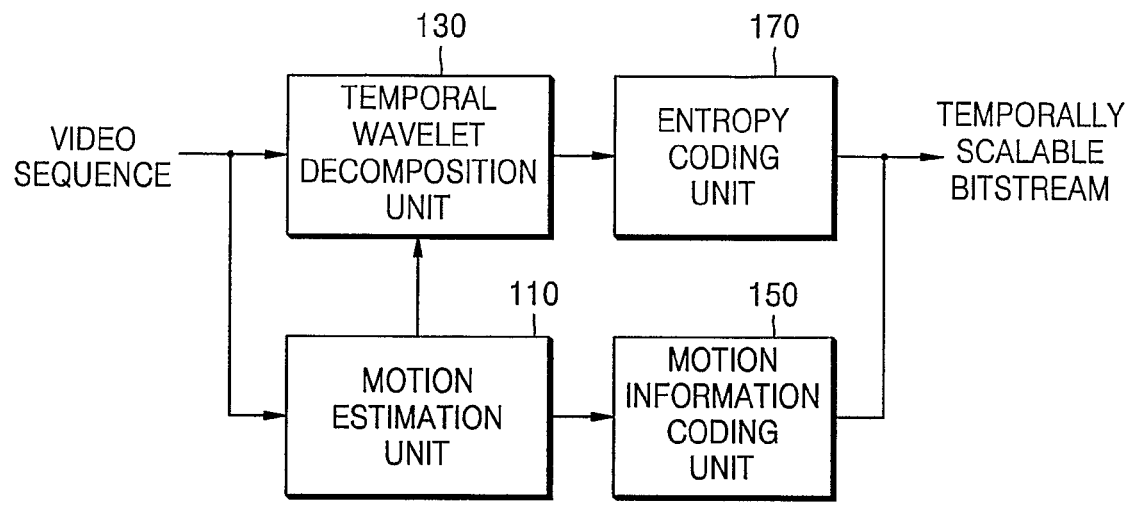
FIG. 1 is a block diagram of a scalable video coding apparatus using a wavelet transform according to an embodiment of the present invention.

The present invention provides a wavelet transform apparatus and method which can reduce visual artifacts that appear in low-frequency frames by adaptively applying an update step according to the accuracy of a motion vector.

The present invention also provides a scalable video coding apparatus and method using a wavelet transform which can reduce visual artifacts that appear in low-frequency frames by adaptively applying an update step according to the accuracy of a motion vector.

The present invention also provides a scalable video decoding apparatus and method using a wavelet transform which can reduce visual artifacts that appear in low-frequency frames by adaptively applying an update step according to the accuracy of a motion vector.

DISCLOSURE OF THE INVENTION

According to an aspect of the present invention, there is provided a lifting-based wavelet transform apparatus including: a prediction unit which performs bi-directional motion compensation on odd-indexed frames based on even-indexed frames and generates high-frequency frames using differential frames from which most of energy is removed; an update determination unit which, in the even-indexed frame, determines whether to update each target block at which a reference block indicated by a motion vector is placed; and an update unit which updates a target block of the even-indexed frame which is determined to be updated by adding the differential frame to each target sub-block included in the target block and generates low-frequency frames.

According to another aspect of the present invention, there is provided a lifting-based wavelet transform method including: performing bi-directional motion compensation on odd-indexed frames based on even-indexed frames and generating high-frequency frames using differential frames from which most of energy is removed; in the even-indexed frame, determining whether to update each target block in which a reference block indicated by a motion vector is placed; and updating a target block which is determined to be updated in the even-indexed frame by adding the differential frame to each target sub-block included in the target block and generating low-frequency frames.

According to still another aspect of the present invention, there is provided a scalable video coding apparatus including: a motion estimation unit which performs motion estimation on a current frame of a video sequence and generates a motion vector; a temporal wavelet decomposition unit which repeatedly performs a prediction step using the motion vector and a modified update step on the video sequence and forms video data with temporal scalability; a motion information coding unit which codes the motion vector provided by the motion estimation unit; and an entropy coding unit which entropy-codes the video data with temporal scalability provided by the temporal wavelet decomposition unit.

According to yet still another aspect of the present invention, there is provided a scalable video coding method including: performing motion estimation on a current frame of a video sequence and generating a motion vector; repeatedly performing a prediction step using the motion vector and a modified update step on the video sequence and forming video data with temporal scalability; coding the motion vector; and entropy-coding the video data with temporal scalability According to a further aspect of the present invention, there is provided a scalable video decoding apparatus including: an entropy-decoding unit which entropy-decodes video data with temporal scalability from a bitstream generated through a prediction step and a modified update step; a motion information decoding unit which decodes motion information from the bitstream and restores a motion vector; and a temporal wavelet synthesizing unit which performs a lifting-based inverse wavelet transform using the restored motion vector on the video data with temporal scalability and reconstructs a video sequence.

According to an additional aspect of the present invention, there is provided a scalable video decoding method including: entropy-decoding video data with temporal scalability from a bitstream generated through a prediction step and a modified update step; decoding motion information from the bitstream and restoring a motion vector; and performing a lifting-based inverse wavelet transform using the restored motion vector on the video data with temporal scalability and reconstructing a video sequence.

According to an additional aspect of the present invention, there is provided a computer-readable recording medium having recorded thereon a computer-readable program for performing the scalable video coding method and the scalable video decoding method, respectively.

EFFECT OF THE INVENTION

The present invention can reduce visual artifacts that appear in low-frequency frames by adaptively applying an update step according to the accuracy of motion vector.

MODES FOR CARRYING OUT THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

FIG. 1 is a block diagram of a scalable video coding apparatus using a wavelet transform according to an embodiment of the present invention. Referring to FIG. 1, the scalable video coding apparatus includes a motion estimation unit 110, a temporal wavelet decomposition unit 130, a motion information coding unit 150, and an entropy coding unit 170.

The motion estimation unit 110 performs bi-directional motion estimation on a current frame of an input video sequence and generates bi-directional motion vectors.

Figure 2:
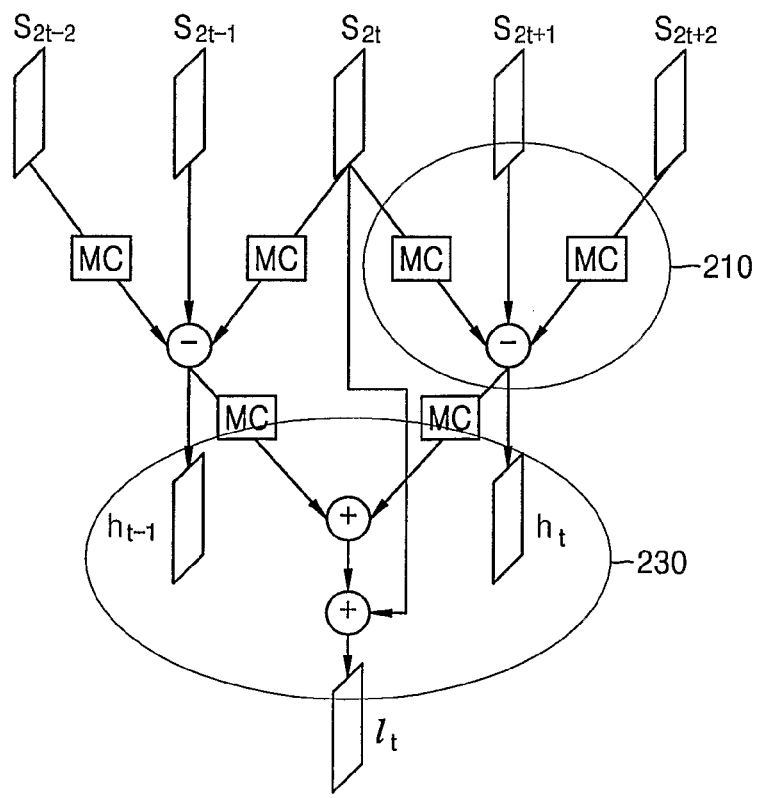
FIG. 2 illustrates a lifting-based wavelet transform performed by a temporal wavelet decomposition unit illustrated in FIG. 1.

The temporal wavelet decomposition unit 130 uses a lifting-based wavelet transform, repeatedly predicts and updates the input video sequence using the bi-directional motion vectors, and creates video data having temporal scalability, i.e., different temporal resolutions. Here, motion compensated temporal filtering (MCTF) may be preferably applied as the lifting-based wavelet transform. FIG. 2 illustrates a prediction step 210 and an update step 230 included in the lifting-based wavelet transform according to an embodiment of the present invention. Referring to FIG. 2, $s_{2t-2}$, $s_{2t-1}$, $s_{2t}$, $s_{2t+1}$, and $S_{2+2}$ respectively indicate frames that constitute a video sequence, MC indicates a motion-compensated video, $h_{t-1}$ and $h_t$ indicate high-frequency frames, and $l_t$ indicates a low-frequency frame.

In an update step according to a first embodiment of the present invention, in a current frame, a weight is calculated for each of four 4×4 sub-blocks included in 8×8 target blocks at which 8×8 blocks indicated by a motion vector are to be placed.

In an update step according to a second embodiment of the present invention, in a current frame, a weight is calculated for each of four 4×4 sub-blocks included in 8×8 target blocks at which 8×8 blocks indicated by a motion vector are to be placed. In this case, weights for unconnected pixels in each 4×4 target sub-block are set to "zero."

In an update step according to a third embodiment of the present invention, in a current frame, it is determined whether to update each 8×8 target block at which 8×8 blocks indicated by motion vectors are to be placed. If it is determined to update an 8×8 target block, a weight is calculated for each of four 4×4 target sub-blocks included in the 8×8 target block.

An update step according to a fourth embodiment of the present invention combines those according to the second and third embodiments. In other words, in a current frame, it is determined whether to update each 8×8 target block at which 8×8 blocks indicated by motion vectors are to be placed. If it is determined to update an 8×8 target block, a weight is calculated for each of four 4×4 target sub-blocks included in the 8×8 target block. In this case, weights for unconnected pixels in each 4×4 target sub-block are set to "zero."

The motion information coding unit 150 encodes motion information, such as bi-directional motion vectors, which are obtained from the motion estimation unit 110 and provides the encoded motion information for packetization.

The entropy coding unit 170 entropy-encodes a video signal with temporal scalability, which is transmitted from the temporal wavelet decomposition unit 130, and provides the entropy-encoded video signal for packetization.

Although not shown, the scalable video coding apparatus may further include a spatial wavelet decomposition unit after the temporal wavelet decomposition unit 110 to provide spatial scalability as well as temporal scalability.

Figure 3:
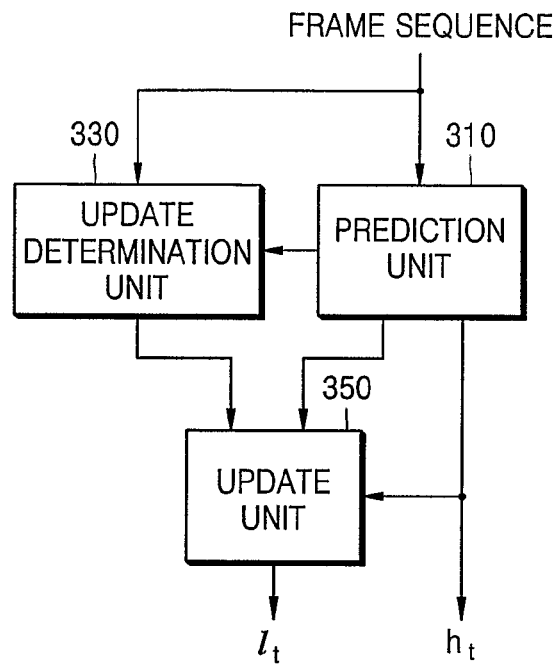
FIG. 3 is a block diagram of a lifting-based wavelet transform apparatus according to an embodiment of the present invention.

FIG. 3 is a block diagram of a lifting-based wavelet transform apparatus according to an embodiment of the present invention. The lifting-based wavelet transform apparatus includes a prediction unit 310, an update determination unit 330, and an update unit 350.

Referring to FIG. 3, the prediction unit 310 performs bi-directional motion compensation on odd-indexed frames based on even-indexed frames and generates high-frequency frames using differential frames from which as much energy as possible is removed.

The update determination unit 330 determines whether to update, for example, each 8×8 target block at which, for example, an 8×8 reference block indicated by a motion vector is placed in an even-indexed frame, or whether to skip the update step. In the above first embodiment of the present invention, the update determination unit 330 is not required.

If the update determination unit 330 determines to update an 8×8 target block, the update unit 350 updates the 8×8 target block by adding the differential frame to each 4×4 target sub-block of the 8×8 target block and generates a low-frequency frame. Here, a content-adaptive update mechanism which is similar to "Response of ce le in SVC: Content-Adaptive Update Based on Human Vision System" by L. Song, J. Xu, H. Xiong, and F. Wu (ISO/IEC JTC1/SC29/WG11MPEG M11127, Redmond, July 2004) described above may be used.

In the update step according to the first embodiment of the present invention, 8×8 target blocks at which 8×8 blocks indicated by motion vectors are placed in an even-indexed frame are updated. In this case, a weight is calculated for each of four 4×4 sub-blocks included in the 8×8 target block and is applied to all pixels in each 4×4 sub-block.

In the update step according to the second embodiment of the present invention, a weight is calculated for each 4×4 target sub-block and is applied to connected pixels in each 4×4 target sub-block, and weights for unconnected pixels are set to "zero."

In the update step according to the third embodiment of the present invention, in a current frame, it is determined whether to update each 8×8 target block at which 8×8 blocks indicated by motion vectors are placed. If it is determined to update an 8×8 target block, a weight is calculated for each of four 4×4 target sub-blocks included in the 8×8 target block and is applied to all pixels in each 4×4 target sub-block. In the update step according to the fourth embodiment of the present invention, a weight is calculated for each of four 4×4 target sub-blocks included in an 8×8 target block which is determined to be updated and is applied to connected pixels in each 4×4 target sub-block, and weights for unconnected pixels in each 4×4 target sub-block are set to "zero."

Figure 4:
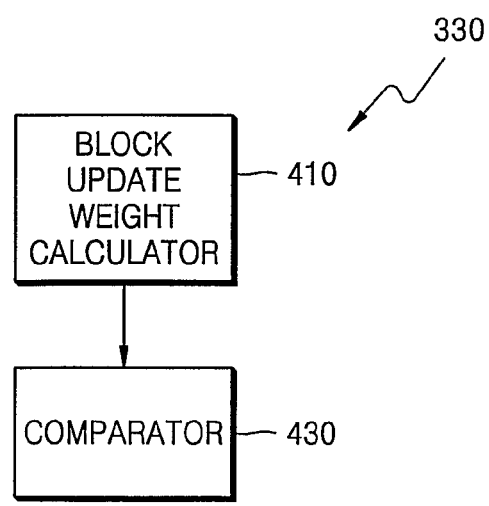
FIG. 4 is a detailed block diagram of an update determination unit of FIG. 3.

FIG. 4 is a detailed block diagram of the update determination unit 330 of FIG. 3. Referring to FIG. 4, the update determination unit 330 includes a block update weight calculator 410 and a comparator 430.

Referring to FIG. 4, the block update weight calculator 410 calculates a block update weight using the number of pixels included in an 8×8 target block and the number of connected pixels in the 8×8 target block which is obtained from an 8×8 block indicated by a motion vector in an even-indexed frame.

More specifically, the number of connected pixels $c_k[i,j]$ in an 8×8 target block $B_k[1,j]$ where an 8×8 block indicated by a motion vector is placed is calculated by adding connected pixels in four 4×4 target sub-blocks and may be expressed as $$c_k[i, j] = \sum_{p=0}^{1} \sum_{q=0}^{1} numConnectedLX[i + p, j + q][r], \quad (3)$$

where a reference frame index r of a list X indicates a reference frame which provides a maximum number of connected pixels for an 8×8 target block, among multiple reference frames.

A block update weight $b_k[i,j]$ for an 8×8 target block $B_k[i, j][r]$ may be defined as $$b_k[i, j] = \frac{c_k[i, j]}{N_{B_k[i,j]}}, \quad (4)$$

where $N_{B_k[i,j]}$ indicates the number of entire pixels included in an 8×8 target block, that is, 64. In other words, a block update weight for an 8×8 target block is a ratio of the number of entire pixels included in an 8×8 target block to the number of connected pixels in the 8×8 target block.

The comparator 430 compares the block update weight $b_k[i, j]$ provided by the block update weight calculator 410 with a predetermined threshold. If the block update weight $b_k[i, j]$ is smaller than the predetermined threshold, it is determined that the entire 8×8 target block will not be updated. When the block update weight $b_k[i, j]$ is smaller than the predetermined threshold, the number of connected pixels in the 8×8 target block is much smaller than the number of entire pixels included in the 8×8 target block, which represents a low accuracy of motion vector.

If the block update weight $b_k[i, j]$ is greater than the predetermined threshold, the comparator 333 determines to update the 8×8 target block. When the block update weight $b_k[i, j]$ is greater than the predetermined threshold, the 8×8 target block has the number of connected pixels more than a constant level, compared to the number of entire pixels included in the 8×8 target block, which represents a high accuracy of motion vector. The predetermined threshold is an optimal value which can be obtained experimentally to reduce visual artefacts from low-frequency frames generated in the update step. As described above, the update step is performed on an 8×8 target block only when the accuracy of motion vector is higher than the constant level.

Figure 5:
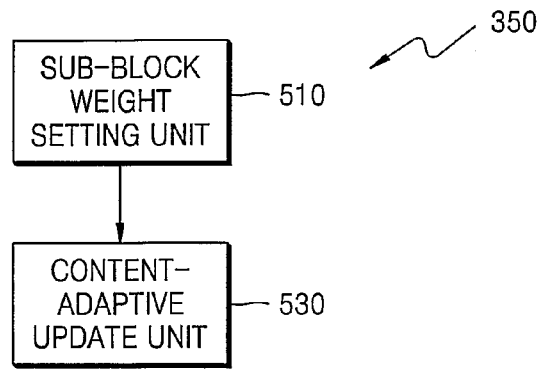
FIG. 5 is a detailed block diagram of an update unit of FIG. 3.

FIG. 5 is a detailed block diagram of the update unit 350 of FIG. 3. The update unit 350 includes a sub-block weight setting unit 510 and a content-adaptive update unit 530.

Referring to FIG. 5, the sub-block weight setting unit 510 sets a weight $w_k[p, q]$ for a 4×4 target sub-block included in an 8×8 target block using the number $N_{P_k[p,q]}$ of entire pixels included in the 4×4 target sub-block and the number of connected pixels in the 4×4 target sub-block. The weight $w_k[p,q]$ may be defined as $$w_k[p, q] = \frac{numConnectedLX[p, q][r]}{N_{P_k[p,q]}} \quad (5)$$

According to the first and third embodiments of the present invention, a weight for a 4×4 target sub-block is calculated using Equation 5 and applied to all pixels in the 4×4 target sub-block.

According to the second and fourth embodiments of the present invention, a weight for a 4×4 target sub-block is calculated using Equation 5 and applied to connected pixels in the 4×4 target sub-block. To unconnected pixels, "zero" is allocated as a weight.

The content-adaptive update unit 530 performs a content-adaptive update step using a weight set by the sub-block weight setting unit 510.

An example of the content-based update step for the 4×4 target sub-block $P_k[i, j]$ may be defined as Equation 6. Here, a 5/3 wavelet filer was used.

$$l_k = s_{2k} + f(s_{2k}, U_{2k}), \quad (6)$$

where $f(s_{2k}, U_{2k})$ may be defined as $$f(s_{2k}, U_{2k}) = \begin{cases} U_{2k} \cdot w_k[p, q] & \text{if } |U_{2k}| \leq JND_{s_{2k}} \cdot S \cdot w_k[p, q] \\ JND_{s_{2k}} \cdot S \cdot w_k[p, q] & \text{if } U_{2k} > JND_{s_{2k}} \cdot S \cdot w_k[p, q] \\ -JND_{s_{2k}} \cdot S \cdot w_k[p, q] & \text{if } U_{2k} < -JND_{s_{2k}} \cdot S \cdot w_k[p, q] \end{cases} \quad (7)$$

In Equation 7, S indicates a strength factor, which is set to 60 in the present embodiment but is not limited thereto. In addition, a just noticeable difference (JND) is used to take into consideration the accuracy of a motion model or human visual characteristics and may be defined as $$JND = 1 - \frac{1}{1 + \theta \sigma_x^2(i, j)}, \text{ where } \theta = \frac{D}{\sigma_{xmax}^2}, \quad (8)$$

where $\sigma_x^2(j,j)$ denotes a local variance of an image x in a window centering on a pixel having a coordinate of (i, j) and is calculated in units of, for example, 3×3 windows. In addition, θ denotes a tuning parameter that can be selected for a specific image, and takes a role of adjusting contrast in the JND. Furthermore, $\sigma_{xmax}^2$ denotes a maximum local variance of a given image, and D has a value in the range of 50 to 100 and is determined experimentally.

As described above, the JND is calculated in units of 4×4 sub-blocks, and one of the above three update steps is performed according to the calculated JND. Hence, a threshold of a visibility function is adaptively set according to the accuracy of a motion model. In other words, since a JND function is adaptive to local frame characteristics related to visual masking, the update step using the JND can reduce visual artefacts such as ghosting, which are provided from high-frequency frames, and thus enhance coding performance for temporal scalability. The content-adaptive update step using the JND is described in detail in "Responses of ce le in SVC: Content-Adaptive Update Based on Human Vision System" by L. Song, J. Xu, H. Xiong, and F. Wu (ISO/IEC JTC1/SC29/WG11MPEG M11129, Redmond, July 2004).

Another example of the content-based update step for the 4×4 target sub-block $P_k[i, j]$ may be defined as Equation 9. In Equation 9, the update operator of Equation 2 described above is slightly modified.

$$U(f_{2k}[X]) = W_k[X]\{w_0 h_{k-1}[X + m_{U0}] + w_1 h_k[X + M_{U1}]\}, \quad (9)$$

where $W_k[X]$ is a weight matrix of a 4×4 target sub-block. A single weight is allocated to 4×4 target sub-block. Alternately, each pixel may have a different weight. In this case, a weight for each pixel may be determined using a technique included in the above content-adaptive update step. Equation 9 may be applied to the first through fourth embodiments of the present invention.

Figure 6:
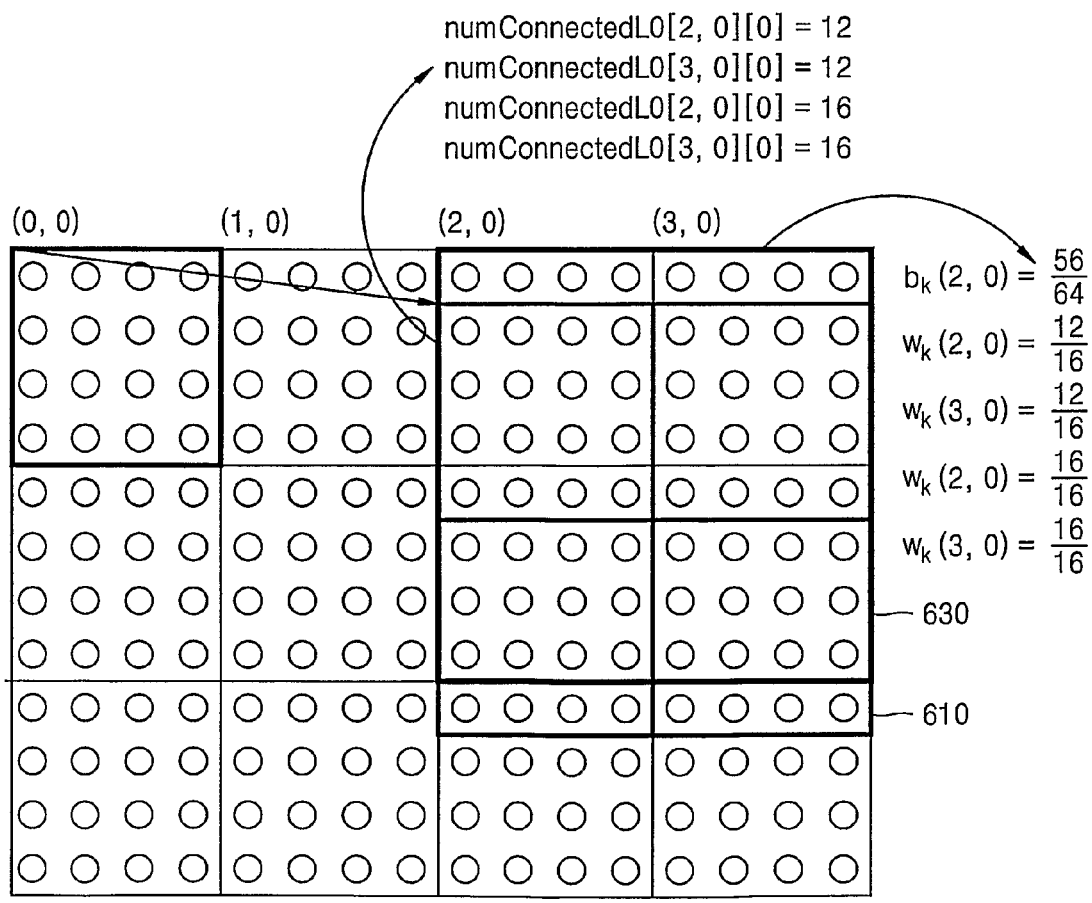
FIG. 6 illustrates a method of setting a weight for a sub-block applied in an update step according to an embodiment of the present invention.

FIG. 6 illustrates a method of setting a weight for a sub-block applied in an update step according to an embodiment of the present invention. Reference numeral 610 is an 8×8 block indicated by a motion vector, and reference numeral 630 is an 8×8 target block. Referring to FIG. 6, the number of connected pixels in an 8×8 target block at a coordinate of (2, 0) is 56. Hence, the block update weight is 56/64. Since the number of connected pixels in a 4×4 target sub-block at the coordinate of (2, 0) is 12, the weight for the 4×4 target sub-block is 12/16. Since the number of connected pixels in a 4×4 target sub-block at the coordinate of (3, 0) is 12, the weight for the 4×4 target sub-block is 12/16. Since the number of connected pixels in a 4×4 target sub-block at the coordinate of (2, 1) is 16, the weight for the 4×4 target sub-block is 16/16. Since the number of connected pixels in a 4×4 target sub-block at the coordinate of (3, 1) is 16, the weight for the 4×4 target sub-block is 16/16. FIG. 6 illustrates a previous reference frame L0 as an example. However, for a subsequent reference frame L1, the number of connected pixels in an 8×8 target block is also calculated, and a reference frame having a maximum number of connected pixels is selected. In other words, the number of all connected pixels in each of estimated reference frames of an 8×8 target block is calculated, and a reference frame having the maximum number of connected pixels, that is, the reference frame L0 or L1, is selected.

FIGS. 7A and 7B respectively illustrate examples of allocating "zero" to unconnected pixels in 4×4 target sub-blocks according to an embodiment of the present invention. Specifically, FIG. 7A illustrates a weight matrix of the 4×4 target sub-block at the coordinate of (2, 0) illustrated in FIG. 6. FIG. 7B illustrates a weight matrix of a 4×4 target sub-block at a coordinate of (2, 1) illustrated in FIG. 6.

Figure 8:
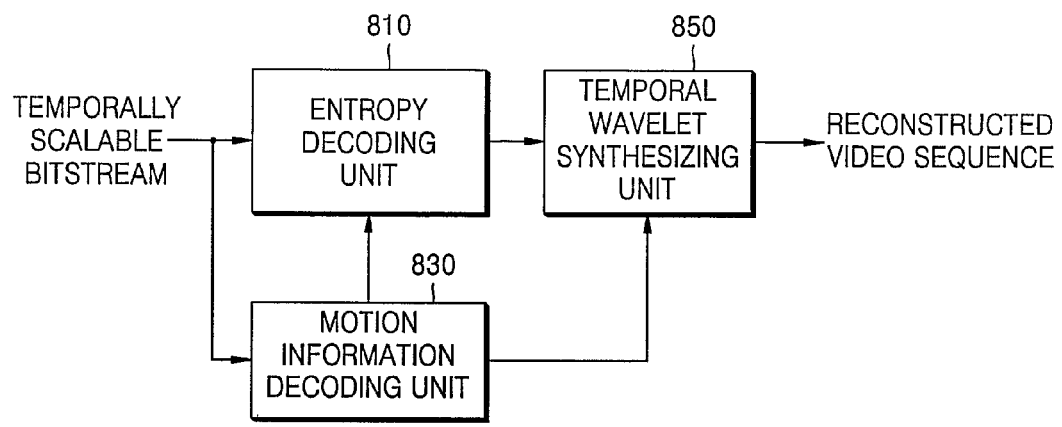
FIG. 8 is a block diagram of a scalable video decoding apparatus according to an embodiment of the present invention.

FIG. 8 is a block diagram of a scalable video decoding apparatus according to an embodiment of the present invention. Referring to FIG. 8, the scalable video decoding apparatus includes an entropy decoding unit 810, a motion information decoding unit 830, and a temporal wavelet synthesizing unit 850.

The entropy decoding unit 810 entropy-decodes video data with temporal scalability from an inversely packetized bitstream. The motion information decoding unit 830 decodes motion information from the inversely packetized bitstream and restores a motion vector.

The temporal wavelet synthesizing unit 850 performs a reverse process of the process performed by the temporal wavelet decomposition unit 130 of FIG. 1. In other words, the temporal wavelet synthesizing unit 850 performs a lifting-based inverse wavelet transform using the restored motion vector on the decoded video data with temporal scalability and reconstructs a video sequence.

Although not shown, the scalable video decoding apparatus may further include a spatial wavelet synthesizing unit before the temporal wavelet synthesizing unit 850 to provide spatial scalability as well as temporal scalability.

Figure 9A:
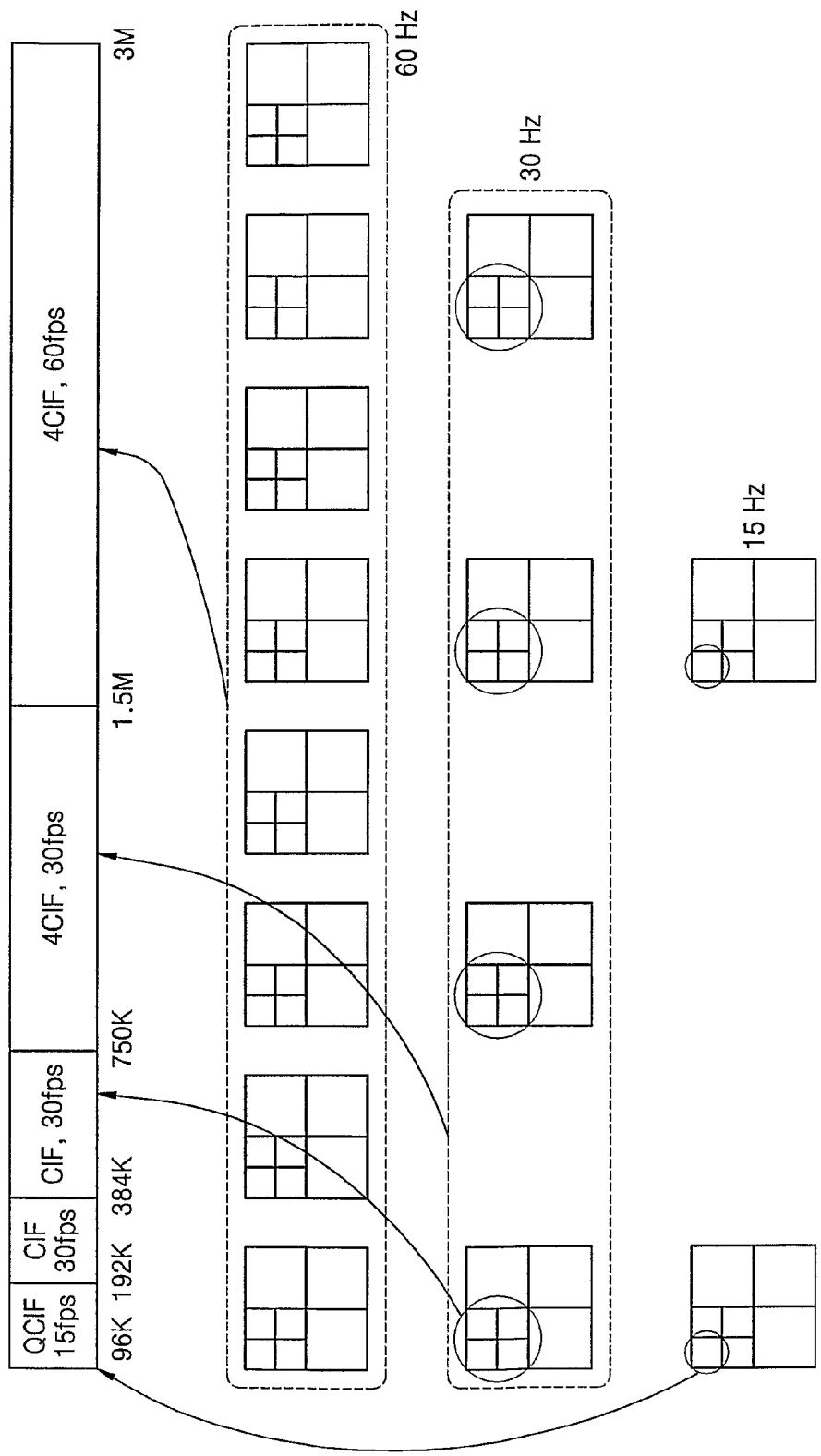
FIGS. 9A and 9B illustrate a bitstream structure according to a first test scenario and a bitstream structure according to a second test scenario to evaluate the performance of an update step according to the present invention.
Figure 9B:
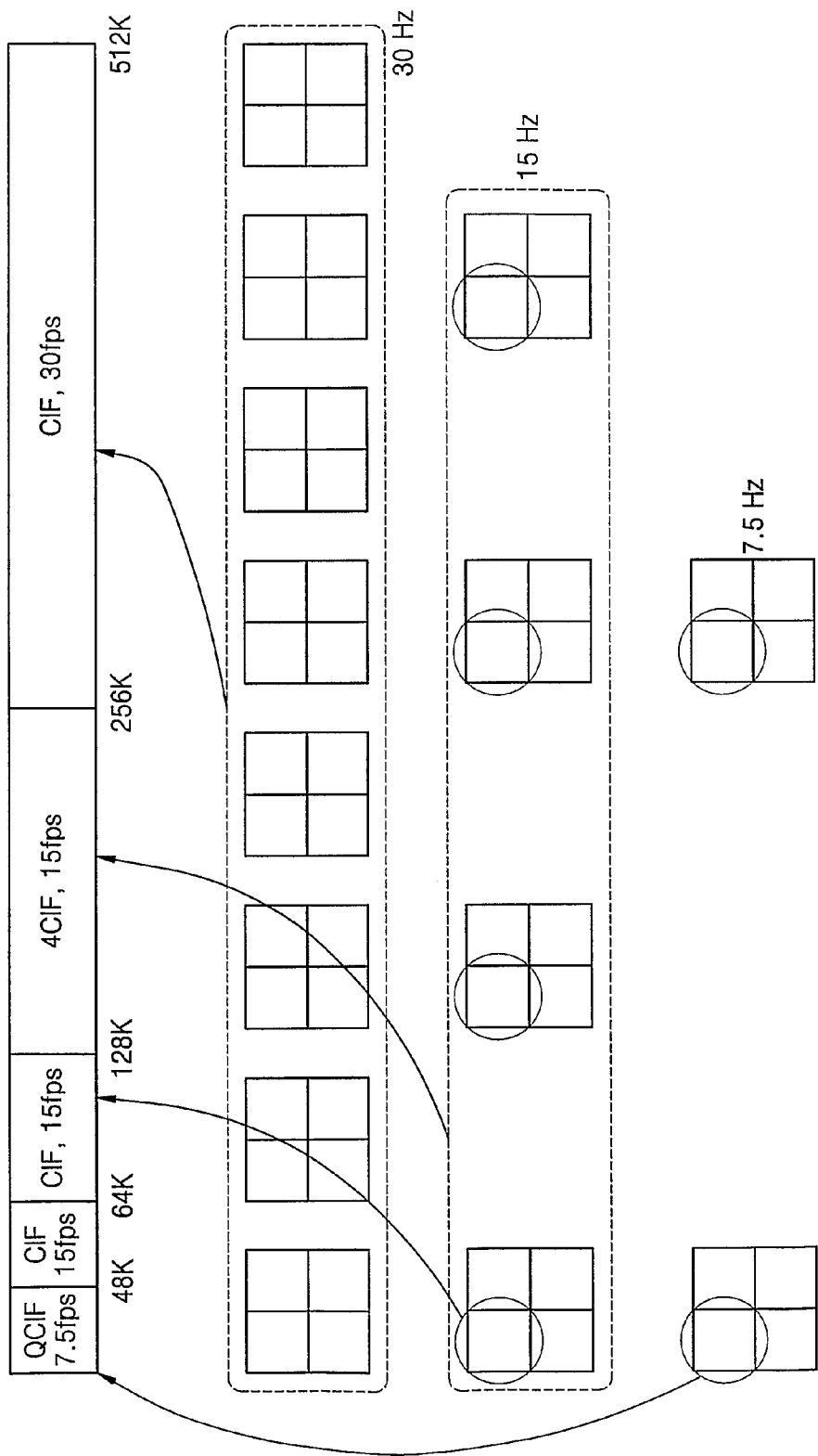

An experiment was conducted to test the performance of the update step according to the present invention. In the experiment, a first test scenario which has a bitstream structure with temporal scalability as shown in FIG. 9A and has conditions shown in Table 1 and a second test scenario which has a bitstream structure with temporal scalability as shown in FIG. 9B and has conditions shown in Table 2 were prepared. Coding was performed in the first and second test scenarios using a conventional HHI software whose update step was modified into the update algorithm according to the present invention and a convention HHI software whose update step was not modified, respectively. Then, the conventional HHI software whose update step was not modified was compared with the conventional HHI software whose update step was modified into the update algorithm according to the present invention in terms of peak signal-to-noise ratios (PSNRs) of Y, U, and V components. The comparison result is shown in Tables 3 and 4. The HHI software is described in "Scalable Extension of H.264/AVC" by H. Schwarz, D. Marpe, and T. Wiegand (ISO/IEC JTC1/SC29/WG11MPEG M10569, Munich, March 2004).

TABLE 1

|  | QCIF@ 15 Hz | CIF@ 30 Hz | 4CIF@ 30 Hz | 4CIF@ 60 Hz |
|---|---|---|---|---|
| CITY | 64 Kbps<br>128 Kbps | 256 Kbps<br>512 Kbps | 1024 Kbps | 2048 Kbps |
| CREW | 96 Kbps<br>192 Kbps | 384 Kbps<br>750 Kbps | 1500 Kbps | 3000 Kbps |
| HARBOUR | 96 Kbps<br>192 Kbps | 384 Kbps<br>750 Kbps | 1500 Kbps | 3000 Kbps |
| SOCCER | 96 Kbps<br>192 Kbps | 384 Kbps<br>750 Kbps | 1500 Kbps | 3000 Kbps |

TABLE 2

|  | QCIF@ 7.5 Hz | CIF@ 15 Hz | CIF@ 15 Hz | CIF@ 30 Hz |
|---|---|---|---|---|
| BUS | 64 Kbps | 96 Kbps | 192 Kbps<br>384 Kbps | 512 Kbps |
| FOOTBALL | 128 Kbps | 192 Kbps | 384 Kbps<br>512 Kbps | 1024 Kbps |
| FOREMAN | 32 Kbps | 48 Kbps | 96 Kbps<br>192 Kbps | 256 Kbps |
| MOBILE | 48 Kbps | 64 Kbps | 128 Kbps<br>256 Kbps | 384 Kbps |

TABLE 3

|  |  | PSNR (HHI) | | | PSNR (Present Invention) | | |
|---|---|---|---|---|---|---|---|
| Sequence | Bitrate | Y (dB) | U (dB) | V (dB) | Y (dB) | U (dB) | V (dB) |
| City | QCIF@15 Hz, 64 Kbps | 34.675 | 42.079 | 43.112 | 35.299 | 42.437 | 43.534 |
|  | QCIF@15 Hz, 128 Kbps | 38.326 | 44.271 | 45.186 | 38.719 | 44.798 | 45.735 |
|  | CIF@30 Hz, 256 Kbps | 32.567 | 42.440 | 43.909 | 33.046 | 42.850 | 44.365 |
|  | CIF@30 Hz, 512 Kbps | 36.853 | 43.867 | 45.283 | 37.000 | 44.220 | 44.564 |
|  | 4CIF@30 Hz, 1024 Kbps | 33.612 | 42.098 | 44.259 | 33.854 | 42.408 | 45.549 |
|  | 4CIF@60 Hz, 2048 Kbps | 35.767 | 42.913 | 44.860 | 35.977 | 43.577 | 44.993 |
| Crew | QCIF@15 Hz, 96 Kbps | 33.066 | 37.301 | 35.631 | 32.937 | 37.151 | 35.541 |
|  | QCIF@15 Hz, 192 Kbps | 36.334 | 39.603 | 38.262 | 36.160 | 39.574 | 38.106 |
|  | CIF@30 Hz, 384 Kbps | 33.465 | 38.756 | 37.450 | 33.510 | 38.808 | 37.440 |
|  | CIF@30 Hz, 750 Kbps | 36.146 | 40.395 | 39.537 | 36.092 | 40.467 | 39.533 |
|  | 4CIF@30 Hz, 1500 Kbps | 35.315 | 40.171 | 40.404 | 35.443 | 40.274 | 40.490 |
|  | 4CIF@60 Hz, 3000 Kbps | 36.407 | 40.698 | 41.366 | 36.508 | 40.902 | 41.621 |
| Harbour | QCIF@15 Hz, 96 Kbps | 31.387 | 39.804 | 42.282 | 31.601 | 40.007 | 42.406 |
|  | QCIF@15 Hz, 192 Kbps | 34.424 | 41.566 | 43.790 | 34.569 | 42.054 | 44.099 |
|  | CIF@30 Hz, 384 Kbps | 29.226 | 40.078 | 42.083 | 29.431 | 40.362 | 42.291 |
|  | CIF@30 Hz, 750 Kbps | 32.243 | 41.024 | 42.911 | 32.363 | 41.473 | 43.234 |
|  | 4CIF@30 Hz, 1500 Kbps | 31.443 | 40.613 | 42.772 | 31.505 | 40.944 | 43.013 |
|  | 4CIF@60 Hz, 3000 Kbps | 33.267 | 41.497 | 43.516 | 33.733 | 42.093 | 44.050 |
| Soccor | QCIF@15 Hz, 96 Kbps | 33.877 | 40.003 | 41.581 | 33.901 | 40.086 | 41.645 |
|  | QCIF@15 Hz, 192 Kbps | 37.795 | 42.473 | 44.050 | 37.829 | 42.637 | 44.225 |
|  | CIF@30 Hz, 384 Kbps | 33.255 | 41.087 | 43.103 | 33.342 | 41.171 | 43.178 |
|  | CIF@30 Hz, 750 Kbps | 36.456 | 42.778 | 44.574 | 36.488 | 42.825 | 44.563 |
|  | 4CIF@30 Hz, 1500 Kbps | 35.066 | 42.477 | 44.482 | 35.157 | 42.529 | 44.579 |
|  | 4CIF@60 Hz, 3000 Kbps | 36.812 | 43.333 | 45.278 | 36.890 | 43.551 | 45.571 |

TABLE 4

|  |  | PSNR (HHI) | | | PSNR (Present Invention) | | |
|---|---|---|---|---|---|---|---|
| Sequence | Bitrate | Y (dB) | U (dB) | V (dB) | Y (dB) | U (dB) | V (dB) |
| Bus | QCIF@7.5 Hz, 64 Kbps | 29.720 | 38.797 | 40.128 | 29.918 | 38.725 | 40.145 |
|  | QCIF@15 Hz, 96 Kbps | 30.043 | 39.097 | 40.399 | 30.242 | 38.935 | 40.449 |

TABLE 4-continued

| Sequence | Bitrate | PSNR (HHI) | | | PSNR (Present Invention) | | |
|---|---|---|---|---|---|---|---|
| | | Y (dB) | U (dB) | V (dB) | Y (dB) | U (dB) | V (dB) |
| | CIF@15 Hz, 192 Kbps | 26.963 | 37.872 | 39.704 | 27.195 | 37.780 | 39.471 |
| | CIF@15 Hz, 384 Kbps | 30.305 | 38.991 | 41.156 | 30.519 | 38.896 | 41.011 |
| | CIF@30 Hz, 512 Kbps | 30.310 | 39.111 | 41.303 | 30.647 | 39.028 | 41.177 |
| Football | QCIF@7.5 Hz, 128 Kbps | 32.720 | 37.174 | 39.158 | 32.737 | 37.087 | 39.062 |
| | QCIF@15 Hz, 192 Kbps | 31.899 | 36.618 | 38.883 | 31.879 | 36.518 | 38.791 |
| | CIF@15 Hz, 384 Kbps | 30.828 | 37.322 | 39.265 | 30.863 | 37.223 | 39.201 |
| | CIF@15 Hz, 512 Kbps | 32.009 | 37.936 | 39.875 | 32.050 | 37.817 | 39.726 |
| | CIF@30 Hz, 1024 Kbps | 33.637 | 39.183 | 40.928 | 33.758 | 39.230 | 40.941 |
| Foreman | QCIF@7.5 Hz, 32 Kbps | 32.756 | 38.706 | 39.140 | 33.101 | 39.018 | 39.457 |
| | QCIF@15 Hz, 48 Kbps | 32.747 | 38.883 | 39.310 | 33.299 | 39.152 | 39.650 |
| | CIF@15 Hz, 96 Kbps | 31.242 | 38.517 | 39.502 | 31.669 | 38.760 | 39.787 |
| | CIF@15 Hz, 192 Kbps | 34.039 | 39.762 | 41.136 | 34.260 | 39.871 | 41.327 |
| | CIF@30 Hz, 256 Kbps | 34.005 | 39.840 | 41.226 | 34.603 | 40.237 | 41.717 |
| Mobile | QCIF@7.5 Hz, 48 Kbps | 29.371 | 32.612 | 31.828 | 29.718 | 33.056 | 32.180 |
| | QCIF@15 Hz, 64 Kbps | 29.488 | 32.483 | 31.618 | 29.885 | 32.869 | 31.933 |
| | CIF@15 Hz, 128 Kbps | 25.135 | 31.451 | 30.860 | 25.378 | 31.643 | 31.046 |
| | CIF@15 Hz, 256 Kbps | 28.444 | 33.300 | 32.847 | 28.595 | 33.527 | 32.993 |
| | CIF@30 Hz, 384 Kbps | 29.480 | 34.023 | 33.544 | 29.755 | 34.201 | 33.663 |

Referring to Tables 3 and 4, when coding was performed using the conventional HHI software the updating algorithm according to the present invention, the PSNRs of the Y, U, and V components relatively increased across the entire bitrates.

Figure 10A:
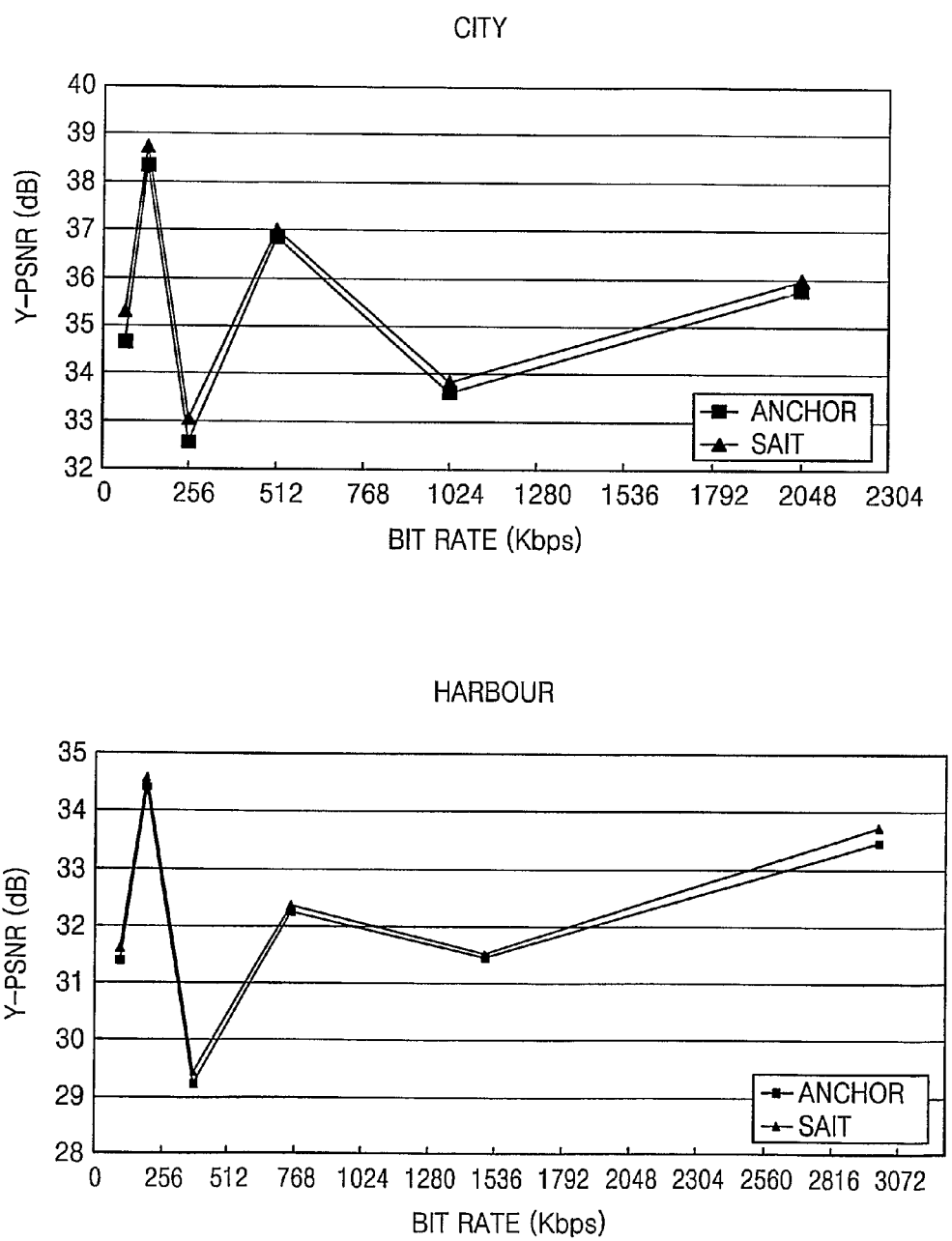
FIGS. 10A through 10D are graphs comparing objective performances of the update step according to the present invention and a conventional update step.
Figure 10B:
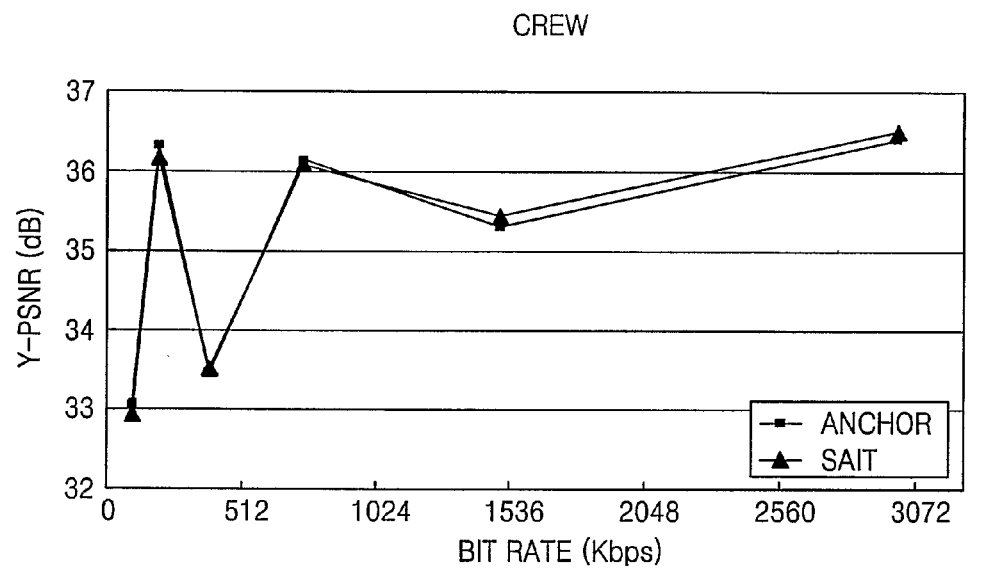
Figure 10B:
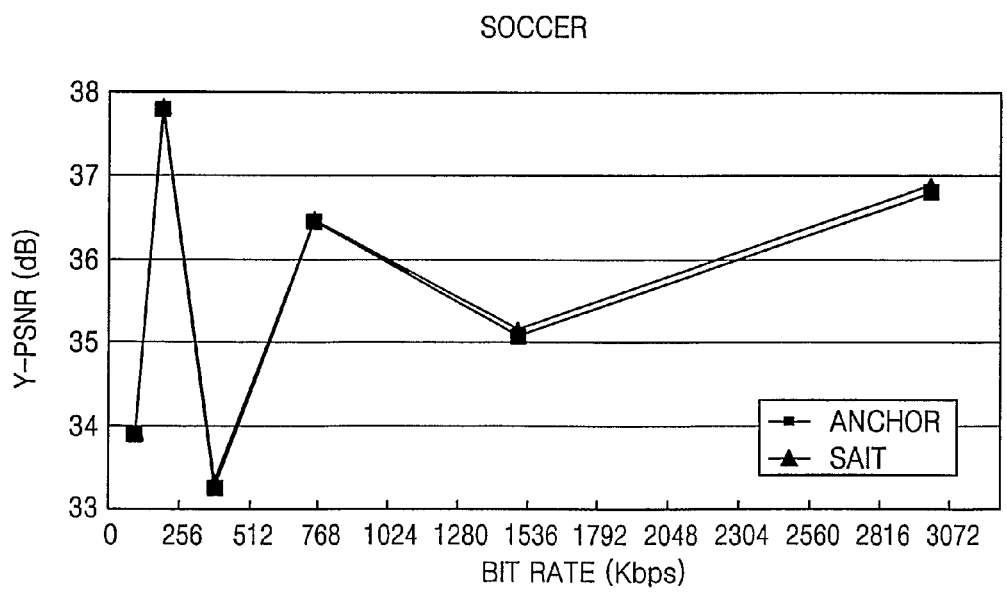
Figure 10C:
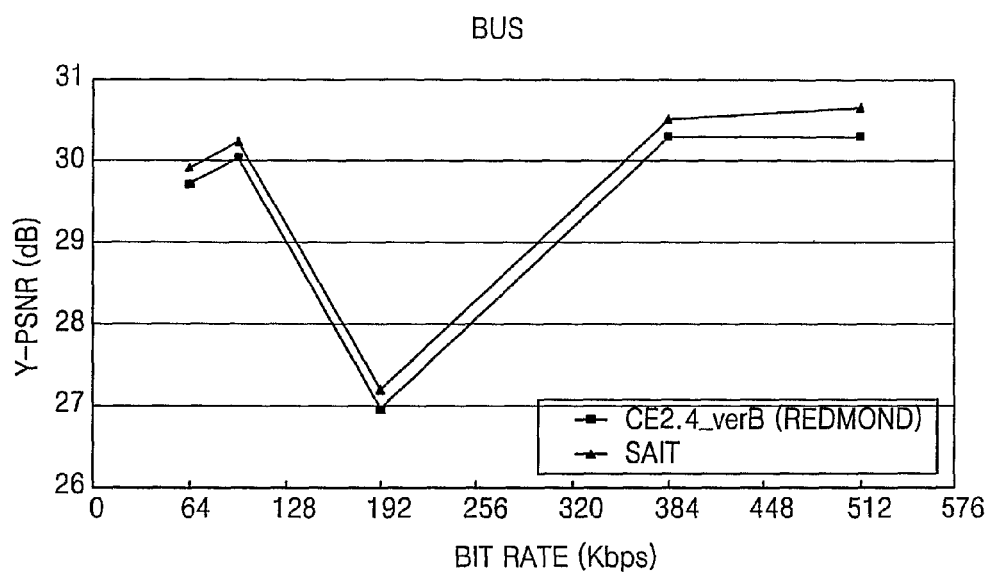
Figure 10C:
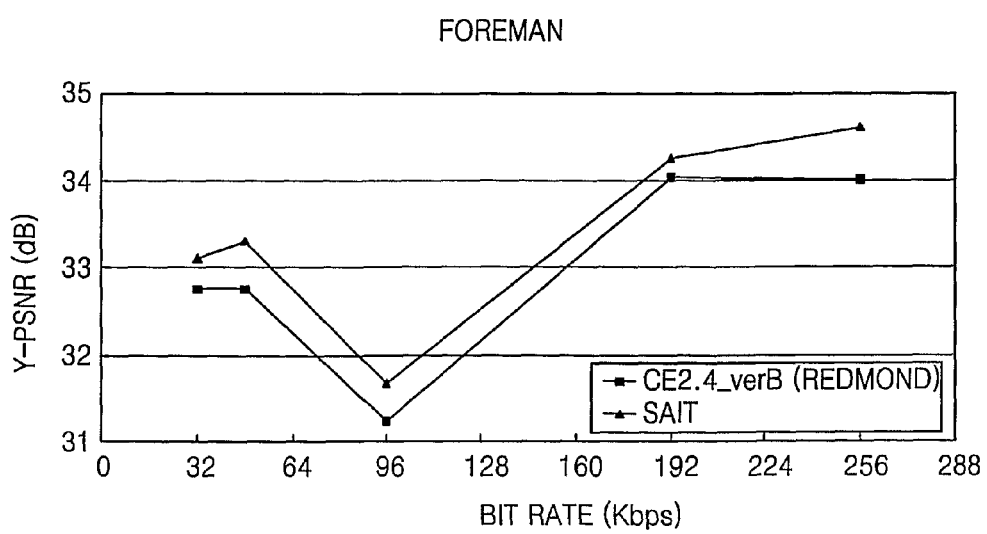
Figure 10D:
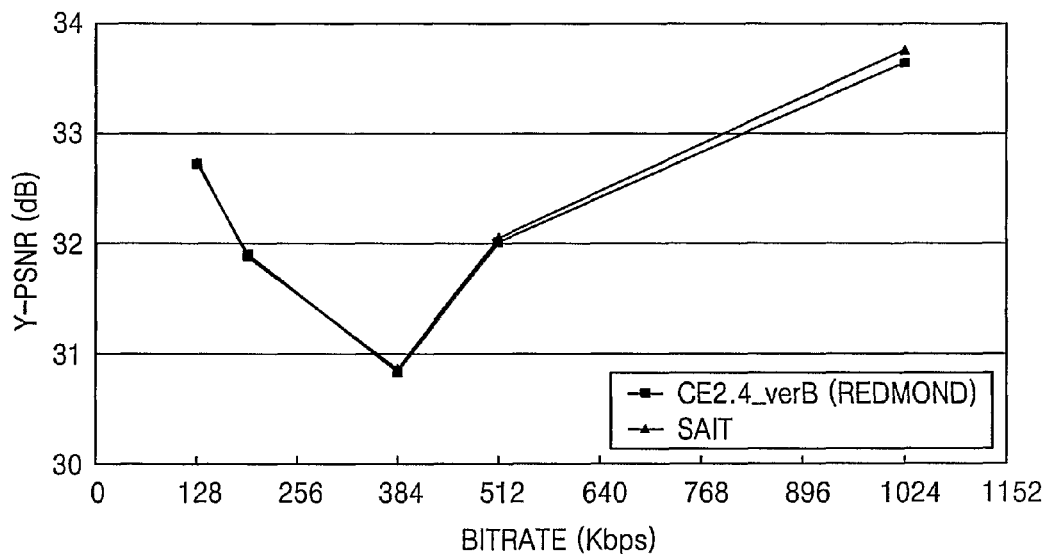
Figure 10D:
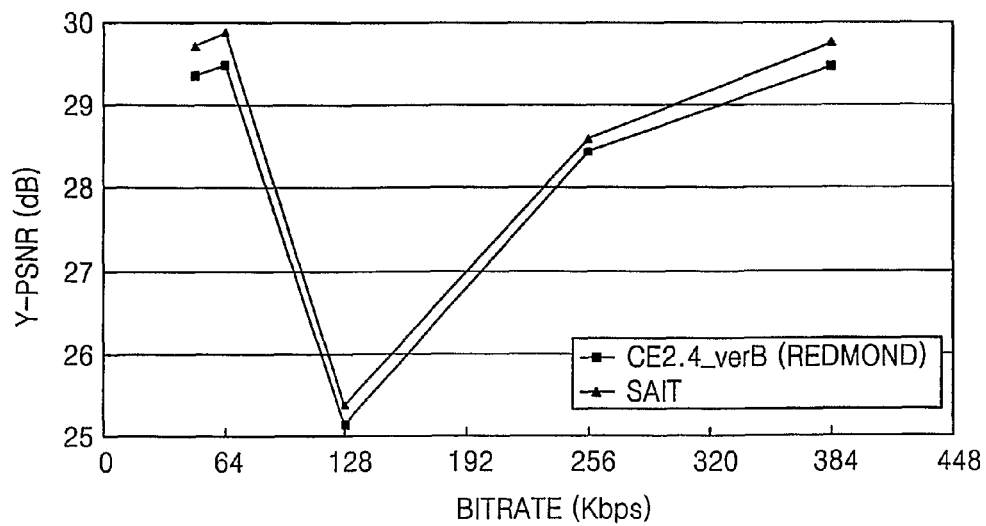

FIGS. 10A through 10D are graphs comparing PSNRs of luminance components to evaluate objective performances of the update algorithm according to the present invention and the conventional update algorithm. Specifically, FIG. 10A is a graph illustrating PSNRs of luminance components included in a reconstructed "City" video and a reconstructed "Crew" video in the first test scenario. FIG. 10B is a graph illustrating PSNRs of luminance components included in a reconstructed "Harbour" video and a reconstructed "Soccer" video in the first test scenario. FIG. 10C is a graph illustrating PSNR of luminance components included in a reconstructed "Bus" video and a reconstructed "Football" video in the second test scenario. FIG. 10D is a graph illustrating PSNRs of luminance components included in a reconstructed "Foreman" video and a reconstructed "Mobile" video in the second test scenario. Here, "anchor" or "CE2.4_verB (Redmond)" indicates that the convention update algorithm is applied, and "SAIT" indicates that the update algorithm according to the present invention is applied.

Referring to FIGS. 10A through 10D, when encoding was performed using a wavelet transform which applies the update algorithm according to the present invention, PSNRs of luminance components increased by approximately 0.1 dB through 0.5 dB across the entire bitrates, depending on characteristics of an input video sequence.

Figure 11A:
FIGS. 11A and 11B are graphs illustrating a $28^{th}$ frame of a "foreman" sequence to compare subjective performances of the update step according to the present invention and the conventional update step.
Figure 11B:
Figure 12A:
FIGS. 12A and 12B are graphs illustrating a $70^{th}$ frame of the "foreman" sequence to compare the subjective performances of the update step according to the present invention and the conventional update step.
Figure 12B:
Figure 13A:
FIGS. 13A and 13B are graphs illustrating a $92^{nd}$ frame of the "foreman" sequence to compare the subjective performances of the update step according to the present invention and the conventional update step.
Figure 13B:
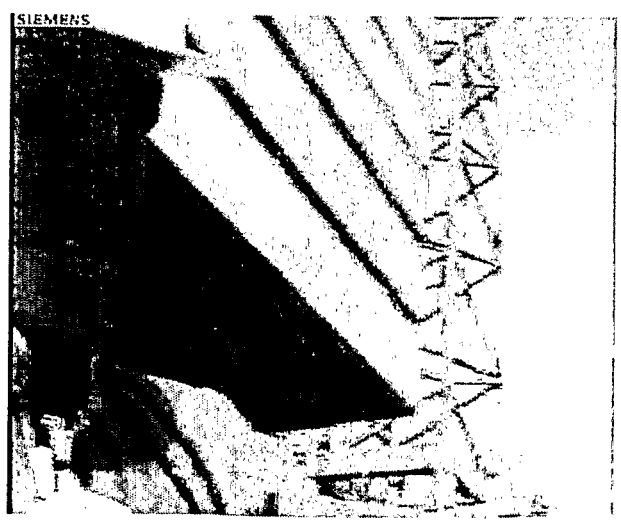
Figure 14A:
FIGS. 14A and 14B are graphs illustrating a $148^{th}$ frame of the "foreman" sequence to compare the subjective performances of the update step according to the present invention and the conventional update step.
Figure 14B:

FIGS. 11A and 11B, 12A and 12B, 13A and 13B, and 14A and 14B are views for subjectively comparing video quality when the updating step according to the present invention is used and when the conventional updating step is used. Specifically, FIGS. 11A and 11B illustrate a 28th frame of a "Foreman" sequence which was decoded at 192 Kbps. FIGS. 12A and 12B illustrate a 70th frame of the "Foreman" sequence which was decoded at 192 Kbps. FIGS. 13A and 13B illustrate a 92nd frame of the "Foreman" sequence which was decoded at 192 Kbps. FIGS. 14A and 14B illustrate a 148th frame of a "Crew" sequence which was decoded at 1500 Kbps. FIGS. 11A, 12A, 13A, and 14A show reconstructed videos which were obtained after performing encoding using the conventional wavelet transform. FIGS. 11B, 12B, 13B, and 14B show reconstructed videos which were obtained after performing coding using the wavelet transform which applies the update step according to the present invention. It can be seen that visual artifacts such as ghosting are significantly reduced from each video when the update step according to the present invention was used.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

As described above, according to the present invention, an update step is adaptively performed according to the accuracy of motion vector or human visual characteristics. Therefore, visual artifacts, such as ghosting, that occur in low-frequency frames can be remarkably removed.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:
1. A scalable video coding apparatus comprising:
a motion estimation unit which performs motion estimation on a current frame of a video sequence and generates a motion vector;
a temporal wavelet decomposition unit, executed by at least one processing device, which repeatedly performs a prediction step using the motion vector and a modified update step on the video sequence and forms video data with temporal scalability;
a motion information coding unit which codes the motion vector provided by the motion estimation unit; and an entropy coding unit which entropy-codes the video data with temporal scalability provided by the temporal wavelet decomposition unit, wherein, for the modified update step, in the current frame, the temporal wavelet decomposition unit calculates a weight for each of a plurality of target sub-blocks included in a target block at which a reference block indicated by the motion vector is placed, and the weight is calculated using the number of entire pixels included in each target sub-block and the number of connected pixels in each target sub-block.

2. The coding apparatus of claim 1, wherein, for the modified update step, in the current frame, the temporal wavelet decomposition unit sets weights for unconnected pixels to zero.

3. A scalable video coding apparatus comprising:
a motion estimation unit which performs motion estimation on a current frame of a video sequence and generates a motion vector;
a temporal wavelet decomposition unit, executed by at least one processing device, which repeatedly performs a prediction step using the motion vector and a modified update step on the video sequence and forms video data with temporal scalability;
a motion information coding unit which codes the motion vector provided by the motion estimation unit; and
an entropy coding unit which entropy-codes the video data with temporal scalability provided by the temporal wavelet decomposition unit,
wherein, for the modified update step, in the current frame, the temporal wavelet decomposition unit determines whether to update each target block at which a reference block indicated by the motion vector is placed and calculates a weight for each target sub-block included in a target block to be updated, and
the weight is calculated using the number of entire pixels included in each target sub-block and the number of connected pixels in each target sub-block.

4. The coding apparatus of claim 3, wherein, for the modified update step, in the current frame, the temporal wavelet decomposition unit sets weights for the unconnected pixels in each target sub-block to zero.

5. A scalable video coding method comprising:
performing motion estimation on a current frame of a video sequence and generating a motion vector;
repeatedly performing a prediction step using the motion vector and a modified update step on the video sequence and forming video data with temporal scalability;
coding the motion vector; and
entropy-coding the video data with temporal scalability,
wherein, for the modified update step, in the current frame, the forming of the video data with temporal scalability comprises calculating a weight for each target sub-block included in a target block at which a reference block indicated by the motion vector is placed, and
the weight is calculated using the number of entire pixels included in each target sub-block and the number of connected pixels in each target sub-block.

6. The coding method of claim 5, wherein, for the modified update step, the forming of the video data with temporal scalability further comprises setting weights for unconnected pixels in each target sub-block to zero.

7. A scalable video coding method comprising:
performing motion estimation on a current frame of a video sequence and generating a motion vector;
repeatedly performing a prediction step using the motion vector and a modified update step on the video sequence and forming video data with temporal scalability;
coding the motion vector; and
entropy-coding the video data with temporal scalability,
wherein, for the modified update step, the forming of the video data with temporal scalability comprises:
in the current frame, determining whether to update each target block at which a reference block indicated by the motion vector is placed; and
calculating the weight for each target sub-block included in a target block to be updated and
the weight is calculated using the number of entire pixels included in each target sub-block and the number of connected pixels in each target sub-block.

8. The coding method of claim 7, wherein, for the modified update step, the forming of the video data with temporal scalability further comprises setting the weights for the unconnected pixels in each target sub-block to zero.

9. A scalable video decoding apparatus comprising:
an entropy-decoding unit which entropy-decodes video data with temporal scalability from a bitstream generated through a prediction step and a modified update step, wherein, for the modified update step, in the current frame, the temporal wavelet decomposition unit calculates a weight for each of a plurality of target sub-blocks included in a target block at which a reference block indicated by the motion vector is placed;
a motion information decoding unit which decodes motion information from the bitstream and restores a motion vector; and
a temporal wavelet synthesizing unit executed by at least one processing device, which performs a lifting-based inverse wavelet transform using the restored motion vector on the video data with temporal scalability and reconstructs a video sequence,
wherein the weight is calculated using the number of entire pixels included in each target sub-block and the number of connected pixels in each target sub-block.

10. A scalable video decoding method comprising:
entropy-decoding video data with temporal scalability from a bitstream generated through a prediction step and a modified update step, wherein, for the modified update step, in the current frame, the temporal wavelet decomposition unit calculates a weight for each of a plurality of target sub-blocks included in a target block at which a reference block indicated by the motion vector is placed;
decoding motion information from the bitstream and restoring a motion vector; and
performing a lifting-based inverse wavelet transform using the restored motion vector on the video data with temporal scalability and reconstructing a video sequence,
wherein the weight is calculated using the number of entire pixels included in each target sub-block and the number of connected pixels in each target sub-block.

11. A non-transitory computer-readable recording medium on which a program for executing a scalable video decoding method of claim 10 is recorded.

12. A lifting-based wavelet transform apparatus comprising:
a prediction unit, executed by at least one processing device, which performs bi-directional motion compensation on odd-indexed frames based on even-indexed frames and generates high-frequency frames using differential frames from which most of energy is removed;

an update determination unit which, in the even-indexed frame, determines whether to update each target block at which a reference block indicated by a motion vector is placed; and an update unit which updates a target block of the even-indexed frame which is determined to be updated by adding the differential frame to each target sub-block included in the target block and generates low-frequency frames, wherein the update determination unit comprises:

a block update weight calculator which, in the even-indexed frame, calculates a block update weight using the number of entire pixels included in the target block and the number of connected pixels in the target block obtained from the reference block indicated by the motion vector; and a comparator which compares the block update weight of the target block with a predetermined threshold and determines whether to update the target block based on the comparison result, and the update unit comprises a sub-block weight setting unit which sets a weight for each target sub-block included in the target block using the number of entire pixels included in each target sub-block and the number of connected pixels in each target sub-block.

13. The transform apparatus of claim 12, wherein the update unit further comprises:

a content-adaptive update unit which performs a content-adaptive update step on each pixel using the set weight for each target sub-block.

14. The transform apparatus of claim 13, wherein the sub-block weight setting unit allocates the set weight to the connected pixels in each target sub-block and sets weights for unconnected pixels in each target sub-block to zero.

15. A lifting-based wavelet transform apparatus comprising:

a prediction unit, executed by at least one processing device, which performs bi-directional motion compensation on odd-indexed frames based on even-indexed frames and generates high-frequency frames using differential frames from which most of energy is removed; and an update unit which updates a target block in the even-indexed frame by adding the differential frame to each target sub-block included in the target block and generates low-frequency frames, wherein the update unit comprises:

a sub-block weight setting unit which sets a weight for each target sub-block included in the target block using the number of entire pixels included in each target sub-block and the number of connected pixels in each target sub-block; and a content-adaptive update unit which performs a content-adaptive update step on each pixel using the set weight for each target sub-block.

16. The transform apparatus of claim 15, wherein the sub-block weight setting unit allocates the set weight to the connected pixels in each target sub-block and sets weights for unconnected pixels in each target sub-block to zero.

17. A lifting-based wavelet transform method comprising:

performing bi-directional motion compensation on odd-indexed frames based on even-indexed frames and generating high-frequency frames using differential frames from which most of energy is removed;

in the even-indexed frame, determining whether to update each target block in which a reference block indicated by a motion vector is placed; and updating a target block which is determined to be updated in the even-indexed frame by adding the differential frame to each target sub-block included in the target block and generating low-frequency frames, wherein the determining whether to update each target block comprises:

in the even-indexed frame, calculating a block update weight using the number of entire pixels included in the target block and the number of connected pixels in the target block obtained from the reference block indicated by the motion vector; and comparing the block update weight of the target block with a predetermined threshold and determines whether to update the target block based on the comparison result.

18. A lifting-based wavelet transform method comprising:

performing bi-directional motion compensation on odd-indexed frames based on even-indexed frames and generating high-frequency frames using differential frames from which most of energy is removed;

setting a weight for each target sub-block included in a target block in the even-indexed frame using the number of pixels included in each target sub-block and the number of connected pixels in each target sub-block; and performing a content-adaptive update step on each pixel using the set weight for each target sub-block.

19. The transform method of claim 18, wherein, in the setting of the weight for each target sub-block, the set weight is allocated to the connected pixels in each target sub-block and weights for unconnected pixels in each target sub-block are set to zero.

20. A lifting-based wavelet transform method comprised of a prediction step and an update step, the method comprising:

determining whether to update each 8×8 target block at which an 8×8 block indicated by a motion vector is placed in an even-indexed frame;

setting a weight for each 4×4 target sub-block in an 8×8 target block which is determined to be updated in the even-indexed frame according to the number of connected pixels in each 4×4 target sub-block and performing the update step using the set weight.

21. A lifting-based wavelet transform method comprised of a prediction step and an update step, the method comprising:

in an even-indexed frame, determining whether to update each 8×8 target block at which an 8×8 block indicated by a motion vector is placed;

setting different weights for connected pixels and unconnected pixels included in each 4×4 target sub-block in an 8×8 target block which is determined to be updated in the even-indexed frame and performing the update step using the set weights.

22. A lifting-based wavelet transform method comprised of a prediction step and an update step, the method comprising:

setting different weights for connected pixels and unconnected pixels included in each 4×4 target sub-block of an 8×8 target block in an even-indexed frame and performing the update step using the set weights.

23. A non-transitory computer-readable recording medium on which a program for executing a scalable video coding method of any one of claims 5 through 8 is recorded.

24. A non-transitory computer-readable recording medium on which a program for executing a lifting-based wavelet transform method of any one of claims 17 through 22 is recorded.

* * * * *

UNITED STATES PATENT AND TRADEMARK OFFICE
CERTIFICATE OF CORRECTION

| | | |
|---|---|---|
| PATENT NO. | : 8,509,308 B2 | Page 1 of 1 |
| APPLICATION NO. | : 11/662016 | |
| DATED | : August 13, 2013 | |
| INVENTOR(S) | : Joo-Hee Kim et al. | |

It is certified that error appears in the above-identified patent and that said Letters Patent is hereby corrected as shown below:

In the Claims

In Column 14, Line 12, In Claim 7, delete "updated" and insert -- updated, --, therefor.

Signed and Sealed this
Eighteenth Day of February, 2014

Michelle K. Lee
*Deputy Director of the United States Patent and Trademark Office*